US008615571B2

(12) United States Patent
Bower, III et al.

(10) Patent No.: US 8,615,571 B2
(45) Date of Patent: Dec. 24, 2013

(54) NETWORK ADDRESS ASSIGNMENT IN A DATA CENTER

(75) Inventors: Fred A. Bower, III, Durham, NC (US); Michael H. Nolterieke, Durham, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 12/778,187

(22) Filed: May 12, 2010

(65) Prior Publication Data
US 2011/0282979 A1    Nov. 17, 2011

(51) Int. Cl.
*G06F 15/177* (2006.01)
(52) U.S. Cl.
USPC .......................................... 709/222; 709/220
(58) Field of Classification Search
USPC ................................................ 709/222, 220
See application file for complete search history.

(56) References Cited

U.S. PATENT DOCUMENTS

| 7,231,452 | B2 | 6/2007 | Ananda et al. | |
|---|---|---|---|---|
| 7,356,045 | B2 | 4/2008 | Satapati et al. | |
| 7,536,479 | B2 | 5/2009 | Sahita et al. | |
| 7,586,897 | B2 | 9/2009 | Ruffino et al. | |
| 7,623,547 | B2 | 11/2009 | Dooley et al. | |
| 7,633,888 | B1 * | 12/2009 | Seifer | 370/254 |
| 2004/0107287 | A1 * | 6/2004 | Ananda et al. | 709/230 |
| 2004/0122974 | A1 * | 6/2004 | Murakami | 709/245 |
| 2005/0027778 | A1 * | 2/2005 | Dimitrelis et al. | 709/200 |
| 2005/0163118 | A1 * | 7/2005 | Steindl | 370/389 |
| 2006/0280146 | A1 | 12/2006 | Koodli et al. | |
| 2008/0244102 | A1 * | 10/2008 | Mochizuki | 710/9 |
| 2009/0077208 | A1 * | 3/2009 | Nguyen et al. | 709/221 |
| 2010/0064023 | A1 * | 3/2010 | Basham et al. | 709/213 |
| 2011/0161665 | A1 * | 6/2011 | Perez | 713/161 |

OTHER PUBLICATIONS

IBM (Jan. 19, 2009). On-demand self assignment of an IP address in a non-DHCP environment. IP.com.
Oracle (Apr. 2003). Chapter 4 Making the Transition From IPv4 to IPv6. Sun Microsystems.
Cheon, S. et al. (2006). A VLSM address management method for variable IP sebnetting. Computational Science and Its Applications—ICCSA 2006: International Conference, Proceedings—Part III, LNCS 3982, pp. 73-83. Item Identifier (DOI): 10.1007/11751595 9.

(Continued)

*Primary Examiner* — Jerry Dennison
*Assistant Examiner* — Steven Nguyen
(74) *Attorney, Agent, or Firm* — H. Barrett Spraggins; Thomas E. Tyson; Biggers Kennedy Lenart Spraggins LLP

(57) ABSTRACT

In a data center that includes a number of chassis, with each chassis including a chassis management module and a number of slots, each slot associated with a service processor: network address assignment includes discovering, by a chassis management module of a particular chassis, one or more other chassis management modules; negotiating, by the chassis management module with the other chassis management modules via IPv6 data communications, a chassis-specific range of IPv4 addresses available for assignment to service processors of the particular chassis; providing, by the chassis management module to the service processors of the particular chassis, in dependence upon the chassis-specific range of IPv4 addresses, a base IPv4 address; and determining, by each service processor of the particular chassis, in dependence upon the base IPv4 address and a slot identifier of the slot associated with the service processor, an IPv4 address for the service processor.

22 Claims, 10 Drawing Sheets

(56) References Cited

OTHER PUBLICATIONS

Liu, T. et al. (2009). A new worm exploiting IPv6 and IPv4-IPv6 dual-stack networks: Experiment, modeling, simulation, and defense. IEEE Network, 2009 23/5 (22-29), pp. 9-15. Item Identifier (DOI): 10.1109/MNET.2009.5274918.

Leroy, D. & Bonaventure, O. (2008). A secure mechanism for address block allocation and distribution. 7th International IFIP-TC6 Networking Conference—Networking 2008: AdHoc and Sensor Networks, Wireless Networks, Next Generation Internet. LNCS 4982, pp. 748-755. Item Identifier (DOI): 10.1007/978-3-540-79549-0 65.

Fiuczynski, et al.; The Design and Implementation of an IPv6/IPv4 Network Address and Protocol Translator; Mar. 16, 2010; Dept. of Computer Science and Engineering, University of Washington; Seattle WA, USA.

* cited by examiner

NETWORK ADDRESS ASSIGNMENT IN A DATA CENTER

BACKGROUND OF THE INVENTION

1. Field of the Invention

The field of the invention is data processing, or, more specifically, methods, apparatus, and products for network address assignment in a data center.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer systems that has seen improvements is the area of data communications among computer systems. Standards for data communications are evolving constantly. Today, for example, the primary protocol for data communications amongst computer systems is IPv4. IPv4 (Internet Protocol version four) is the fourth revision in the development of the Internet Protocol (IP) and it is the first version of the protocol to be widely deployed. At present, IPv4 is at the core of standards-based internetworking methods of the Internet and other data communications networks. IPv4 is still by far the most widely deployed Internet Layer protocol. IPv4 is described in IETF publication RFC 791 (September 1981), replacing an earlier definition (RFC 760, January 1980). IPv4 is a connectionless protocol for use on packet-switched Link Layer networks (e.g., Ethernet). IPv4 operates on a best effort delivery model, in that packets are not guaranteed delivery, nor does IPv4 assure proper sequencing, or avoid duplicate delivery. These aspects, including data integrity, are addressed by an upper layer transport protocol (e.g., Transmission Control Protocol).

This data communications protocol, however, is advancing. A new protocol, called IPv6, has been standardized and will likely be the primary protocol for data communications for years to come. IPv6 (Internet Protocol version six) is the next-generation IP version designated as the successor to IPv4. IPv6 was defined in December 1998 by the Internet Engineering Task Force (IETF) with the publication of an Internet standard specification, RFC 2460. IPv6 is an Internet Layer protocol for packet-switched internetworks. The main driving force for the redesign of the Internet Protocol is IPv4 address exhaustion. IPv6 has a vastly larger address space than IPv4. This results from the use of a 128-bit address, whereas IPv4 uses only 32 bits. The new address space thus supports 2128 (about 3.4×1038) addresses. IPv6 also implements new features that simplify aspects of address assignment (stateless address auto-configuration) and network renumbering (prefix and router announcements) when changing Internet connectivity providers.

Although IPv6 is the future standard for data communications protocols, many computer systems today are not configured to operate in accordance with the IPv6 data communications protocol and, as such, typically cannot take advantage of many of the advancements provided by the new standard, such as self-assignment of network addresses. In many typical data centers containing large numbers of server chassis, for example, service processors of servers installed in the chassis are configured only for communication via IPv4 rather than IPv6. In such a data center, if no DHCP server is available to assign IPv4 network addresses, many communications problems may occur such as, for example, entire lack of communications amongst the service processor or network address conflicts (duplicate addresses). More specifically, in some data centers, service processors are configured to attempt to obtain a network address from a DHCP server for two minutes. If no network address is obtained from a DHCP server (the server is unavailable), the service processors are configured to default to a static IP address. Here, network address conflicts arise immediately amongst the service processors. Although IPv6 provides means by which a computing device may obtain an IPv6 address without the need of a DHCP server, reconfiguring many thousands of service processors to operate in accordance with IPv6 is costly and time consuming.

SUMMARY OF THE INVENTION

Methods, apparatus, and products for network address assignment in a data center are disclosed in which the data center includes a number of chassis, with each chassis including a chassis management module and a number of slots and each slot associated with a service processor. Network address assignment in accordance with embodiments of the present invention includes discovering, by a chassis management module of a particular chassis, one or more other chassis management modules in the data center; negotiating, by the chassis management module with the other chassis management modules via IPv6 data communications, a chassis-specific range of IPv4 addresses available for assignment to service processors of the particular chassis; providing, by the chassis management module to the service processors of the particular chassis, in dependence upon the chassis-specific range of IPv4 addresses, a base IPv4 address; and determining, by each service processor of the particular chassis, in dependence upon the base IPv4 address and a slot identifier of the slot associated with the service processor, an IPv4 address for the service processor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
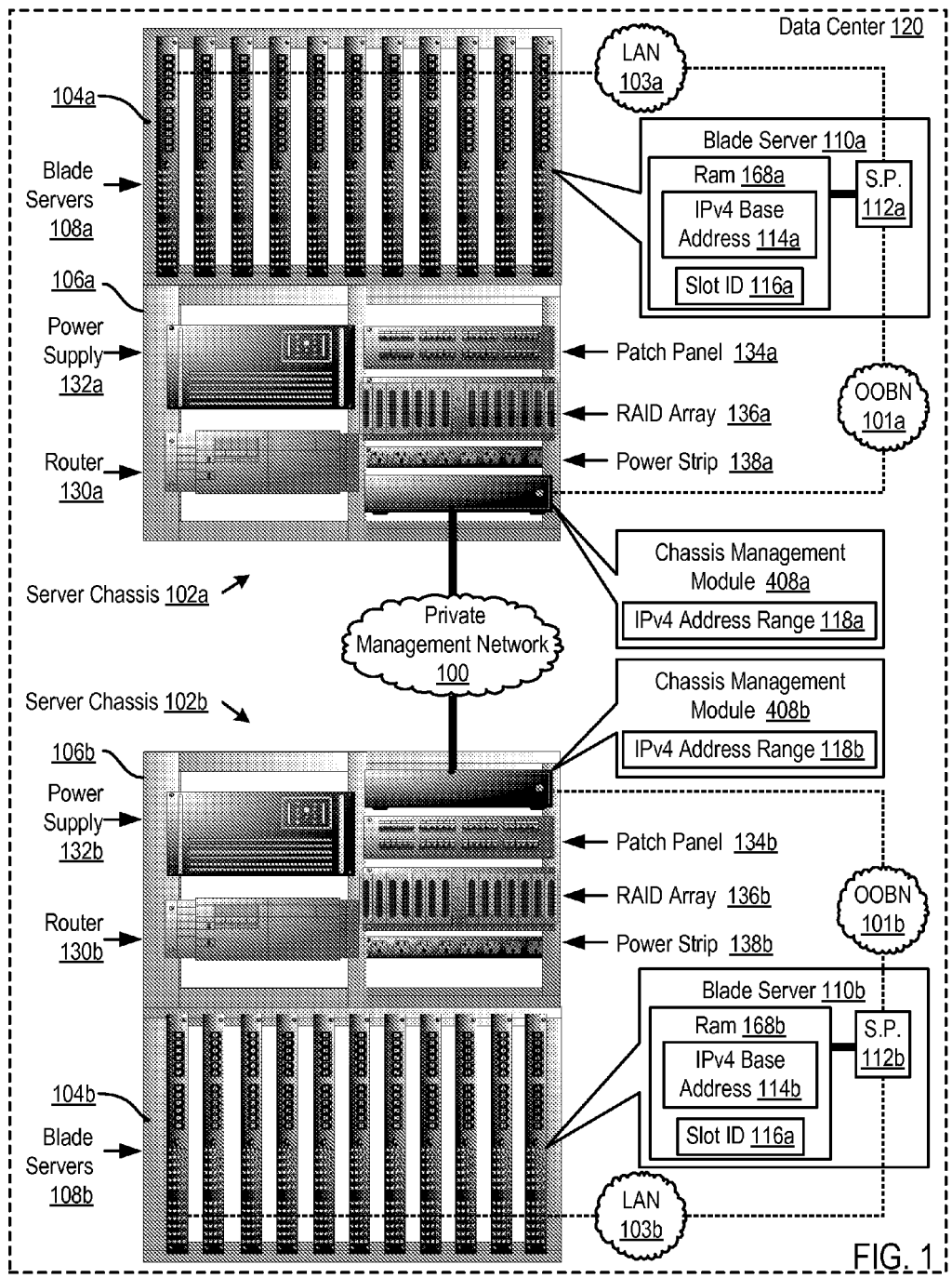
FIG. 1 sets forth a network diagram of a data center in which network address assignment is carried out according to embodiments of the present invention.

Exemplary methods, apparatus, and products for network address assignment in a data center in accordance with the present invention are described with reference to the accompanying drawings, beginning with FIG. 1. FIG. 1 sets forth a network diagram of a data center (120) in which network address assignment is carried out according to embodiments of the present invention. A network address is label, typically numerical, that is assigned to a device coupled for data communications to a data communications network and other devices. In some embodiments of the present invention, a network address refers to an Internet Protocol (IP) address, in which the devices assigned IP address may communicate in accordance with the Internet Protocol. Address assignment in some systems may be carried out through use of a DHCP (Dynamic Host Configuration Protocol) server. A DHCP server is a server that operates in accordance with the DHCP to provide hosts (DHCP clients) with IP address assignments as well as other configuration information. In some data centers, such as the example data center (120) of FIG. 1, a DHCP server may be unavailable for network address assignment. When a DHCP server is unavailable, a device in need of carrying out communication must be assigned an address in another way.

A data center (120) is a facility used to house mission critical computer systems and associated components. Such a data center may include environmental controls (air conditioning, fire suppression, etc.), redundant/backup power supplies, redundant data communications connections, and high security, highlighted by biometric access controls to compartmentalized security zones within the facility. A data center may also house a large amount of electronic equipment, typically computers and communications equipment. A data center may be maintained by an organization for the purpose of handling the data necessary for its operations. A bank, for example, may have a data center, where the bank customers' account information is maintained and transactions involving these accounts are carried out. Practically every company that is mid-sized or larger has some kind of data center with the larger companies often having dozens of data centers.

The example data center (102) of FIG. 1 includes two server chassis (102a, 102b). The term server chassis as used in this specification refers to a system that houses servers as well as other computing devices and support devices—power supplies, network switches, media devices, and the like. A server chassis houses such computing devices, servers, support devices, and so on in a number of designated 'slots.' A slot as the term is used here is a designated receptacle in which a component (server, computing device, support device, and so on) of a server chassis may be installed. A server chassis, for example, may be implanted as a 19-inch or 23-inch server rack, with a number of slots for housing servers, computing devices, support devices and the like. 19-inch racks have a sloth width of 19 inches, 23-inch server racks have a slot width of 23 inches, and both have a slot height of a rack unit (1 U) or 1.75 inches.

Another example type of server chassis, such as the server chassis (102a, 102b) of FIG. 1, includes a blade center. A blade center is a server chassis specifically configured to house a number of blade servers. A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

A blade server is a server computer with a modular design optimized to minimize the use of physical space and energy. Whereas a standard rack-mount server can function with at least a power cord and network cable, blade servers have many components removed to save space, minimize power consumption and other considerations, while still having all the functional components to be considered a computer. A blade center, which can hold multiple blade servers, provides services such as power, cooling, networking, various interconnects and management—though different blade providers have differing principles around what to include in the blade itself (and sometimes in the enclosure altogether).

In the example of FIG. 1, each of the two server chassis (102a, 102b) includes two cabinet bays (104a, 104b, 106a, 106b), each of which includes several components. Cabinet bay (104a, 104b) contains a number of blade servers (108a), each of which is powered by a power supply (132a, 132b). Cabinet bay (106a, 106b) contains a power supply (132a, 132b) for the server chassis (102a, 102b) and a data communications network router (130a, 130b). Cabinet bay (106a, 106b) also contains additional components: a patch panel (134a, 134b), a Redundant Array of Independent Disks ('RAID') (136a, 136b), and a power strip (138a, 138b).

Each chassis (102a, 102b) also includes a chassis management module (408a, 408b). A chassis management module—also called a chassis management element or chassis support element—is a device that may be used by a system administrator to configure and manage components installed in a server chassis (102a, 102b). In addition, a chassis management module may monitor environmental operations of components installed in the server chassis. Although depicted in the example of FIG. 1 as modular device, capable of being installed in and removed from a slot of a server chassis at will, readers of skill in the art will immediately recognize that such a chassis management module may be implemented as part of the server chassis itself, as part of a mid-plane of the server chassis, as part of a back-plane of a server chassis, and so on.

Each slot of each chassis (102a, 102b) is associated with a service processor. A service processor is said to be associated with a slot, and vice versa, in that a service processor may be part of a server installed in a slot, part of the server chassis mid- or back-plane and designated to a particular slot, or otherwise specified to service a particular slot and a computing device, such as a server, installed in the particular slot. In the system of FIG. 1, for example each blade server (108a) includes a service processor such that the service processor of a blade server is 'associated' with the slot in which the blade server is installed. A service processor is a processor separate from a primary CPU of a computer system often located on the motherboard of a system component such as a server, on a PCI card, on the chassis of a blade server or telecommunications platform, on the server chassis and so on. A service processor operates independently from a system's CPU and operating system, even if the CPU or OS is locked up or otherwise inaccessible. Service processors are often used to monitor a component's on-board instrumentation (temperature sensors, CPU status, fan speed, voltages, current, power requirements), provide remote reset or power-cycle capabilities, enable remote access to basic input/output system (BIOS) configuration or administrative console information, and, in some cases, provide keyboard and mouse control.

For clarity of explanation, one blade server of each server chassis (102a, 102b)—blade server (110a) of the server chassis (102a) and blade server (110b) of server chassis (102b)—is depicted in expanded form. Each of the blade servers (110a, 110b) includes a service processor (112a, 112b) operatively coupled through a high speed, data communications bus to computer memory in the form of Random Access Memory (RAM) (168a, 168b). Each service processor (112a, 112b) is coupled for data communications through an out-of-band network (101a, 101b) to a chassis management module (408a, 408b) of their respective server chassis (102a, 102b). The service processors of the blade servers (108a, 108b) are also coupled for data communications through a local area network (LAN) (103a, 103b) to other service processors of other blade servers within the same server chassis.

To communicate with other service processors through the LAN (103a, 103b) in accordance with IPv4, each service processor must be assigned an IPv4 network address. In the example of FIG. 1, no DHCP server is available to the service processors to assign such IPv4 network addresses. The example chassis management modules (408a, 408b) of FIG. 1, however, have been configured for network address assignment in the data center (120) in accordance with embodiments of the present invention. Each chassis management module (408a, 408b) in the example of FIG. 1 may operate for network address assignment in accordance with embodiments of the present invention by: discovering one or more other chassis management modules in the data center (120). In the example of FIG. 1, the chassis management modules (408a, 408b) are coupled to one another for data communications via a private management network (100). The chassis management modules (408a, 408b) in the example of FIG. 1, are configured to communication with one another in accordance with the IPv6 communications protocol. As such, upon startup, without the need of a DHCP server, the chassis management modules (408a, 408b) may effectively assign themselves an IPv6 network address through IPv6 Link Local Address (LLA) or Unique Local Address (ULA) techniques. By contrast, the service processors are not configured to communicate via IPv6 and, as such, require an IPv4 network address to communicate with one another. Each chassis management module (408a, 408b) may discover the other chassis management module (408a, 408b) via a Service Location Protocol discovery message, or the like.

The example chassis management modules (408a, 408b) of FIG. 1, may then negotiate, with the other chassis management module via IPv6 data communications over the private management network (100), a chassis-specific range (118a, 118b) of IPv4 addresses available for assignment to service processors of the particular chassis. An address range is said to be chassis-specific in that each server chassis' address range is unique from other chassis' address ranges. The chassis management module in some embodiments may assign itself an IPv4 address from the chassis-specific address range to enable IPv4 data communications with the service processors of the server chassis. Such an assignment of an IPv4 address to the chassis management module, however, is not a limitation of the present invention, because in other embodiments, such as that depicted in the example of FIG. 1, the chassis management module may be configured to communicate with a service processor through other means, such as through a direct communications link via an out-of-band network (101a, 101b).

The chassis management modules (408a, 408b) upon obtaining a chassis-specific address range may then provide, to the service processors of their chassis, in dependence upon the chassis-specific range (118a, 118b) of IPv4 addresses, a base IPv4 address (114a, 114b). A base IPv4 address is an IPv4 address from which a service processor may determine, or derive, the service processor's network address. One example of a base IPv4 address may be an IPv4 address which the chassis management module assigned to itself. The service processors (112a, 112b), upon receipt of the Base IPv4 address (114a, 114b) may then determine, of the particular chassis, in dependence upon the base IPv4 address and a slot identifier (116a, 116b) of the slot associated with the service processor, an IPv4 address for the service processor. A service processor may add, to the Base IPv4 address, the slot identifier, for example.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1. Servers and chassis management modules may include greater or fewer components than depicted here including any combination of CPUs, other memory, communications adapters, I/O adapters, hard disk drives, optical drives, and so on as will occur to readers of skill in the art.

Network address assignment in a data center in accordance with the present invention is generally implemented with computers, that is, with automated computing machinery. In the system of FIG. 1, for example, all the blade servers (108a, 108b, 110a, 110b) and chassis management modules (408a, 408b) are implemented to some extent at least as computers. For further explanation, therefore, FIG. 2 sets forth a block diagram of automated computing machinery comprising an exemplary computer implementing a chassis management module (408a) useful in network address assignment in a data center according to embodiments of the present invention. The data center is similar to the data center (120) of FIG. 1 which includes a number of chassis (102a, 102b), with each chassis including a chassis management module (408a, 408b) and number of slots, each of which is associated with a service processor (112a, 112b).

Figure 2:
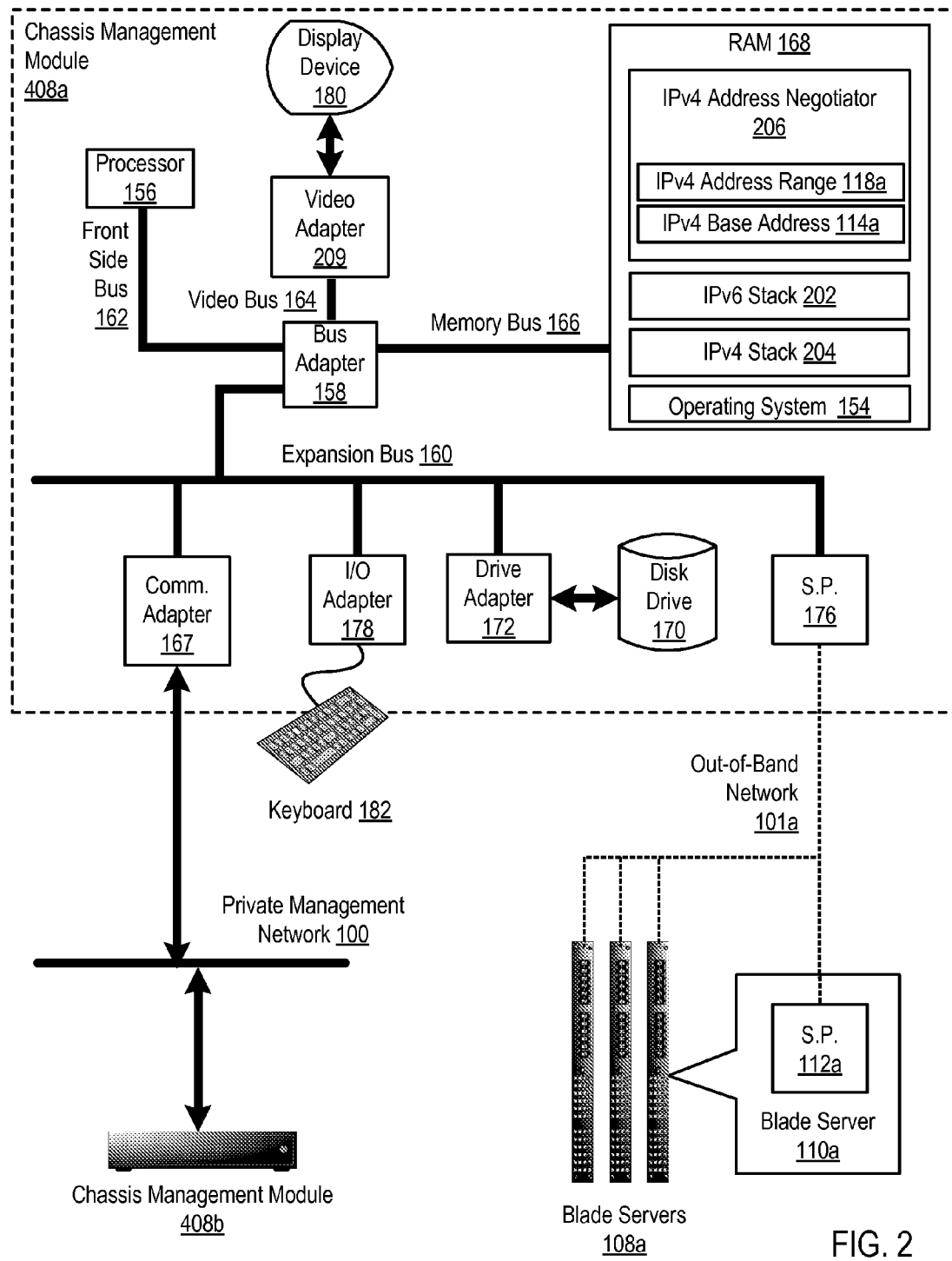
FIG. 2 sets forth a block diagram of automated computing machinery comprising an exemplary computer implementing a chassis management module useful in network address assignment in a data center according to embodiments of the present invention.

The chassis management module (408a) of FIG. 2 includes at least one computer processor (156) or 'CPU' as well as random access memory (168) ('RAM') which is connected through a high speed memory bus (166) and bus adapter (158) to processor (156) and to other components of the chassis management module (408a).

Stored in RAM (168) is an IPv4 address negotiator (206), a module of computer program instructions that, when executed, cause the chassis management module (408a) to carry out network address assignment in accordance with embodiments of the present invention. The IPv4 address negotiator (206) may discover one or more other chassis management modules (408b) in the data center. The IPv4 address negotiator (206) may discover other chassis management modules (408b) in accordance with the IPv6 protocol over the private management network using communications libraries provided in the IPv6 stack (202). The IPv4 address negotiator (206) may then negotiate, with the other chassis management modules (408b) via IPv6 data communications (202), a chassis-specific range (118a) of IPv4 addresses available for assignment to service processors (112a) of the chassis management modules' (408a) chassis. The IPv4 address negotiator may assign an IPv4 address, through use of communications libraries provided in the IPv4 stack (204), to the chassis management module (408a) for future IPv4 communications with the service processors—such an address may be selected by the IPv4 address negotiator (206) as a base IPv4 address to provide to blade servers (108a) of the same chassis. The IPv4 address negotiator (206) may then provide, to the service processors of the particular chassis, in dependence upon the chassis-specific range (118a) of IPv4 addresses, a base IPv4 address (114a). The IPv4 address negotiator (206) may provide the base IPv4 address (114a) to the service processors of the blade servers (108a) by sending the address through an out-of-band network (101a) or through a local area network. Upon receipt f the Base IPv4 address (114a) the service processor (112a) of the blade server (110a)—an expanded depiction of one of the blade servers (108a)—may then determine, in dependence upon the base IPv4 address (114a) and a slot identifier of the slot associated with the service processor (112a), an IPv4 address for the service processor (112a).

Also stored in RAM (168) is an operating system (154). Operating systems useful network address assignment in a data center according to embodiments of the present invention include UNIX™, Linux™, Microsoft XP™, AIX™, IBM's i5/OS™, and others as will occur to those of skill in the art. The operating system (154), IPv4 address negotiator (206), IPv4 stack (204), and the sIPv6 stack (206) in the example of FIG. 2 are shown in RAM (168), but many components of such software typically are stored in non-volatile memory also, such as, for example, on a disk drive (170).

The chassis management module (408a) of FIG. 2 includes disk drive adapter (172) coupled through expansion bus (160) and bus adapter (158) to processor (156) and other components of the chassis management module (408a). Disk drive adapter (172) connects non-volatile data storage to the chassis management module (408a) in the form of disk drive (170). Disk drive adapters useful in computers for network address assignment in a data center according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example chassis management module (408a) of FIG. 2 includes one or more input/output ('I/O') adapters (178). I/O adapters implement user-oriented input/output through, for example, software drivers and computer hardware for controlling output to display devices such as computer display screens, as well as user input from user input devices (182) such as keyboards and mice. The example chassis management module (408a) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary chassis management module (408a) of FIG. 2 includes a communications adapter (167) for data communications with other chassis management modules (408b) and service processors (112a) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for network address assignment in a data center according to embodiments of the present invention include modems for wired dial-up communications, Ethernet (IEEE 802.3) adapters for wired data communications network communications, and 802.11 adapters for wireless data communications network communications.

Figure 3:
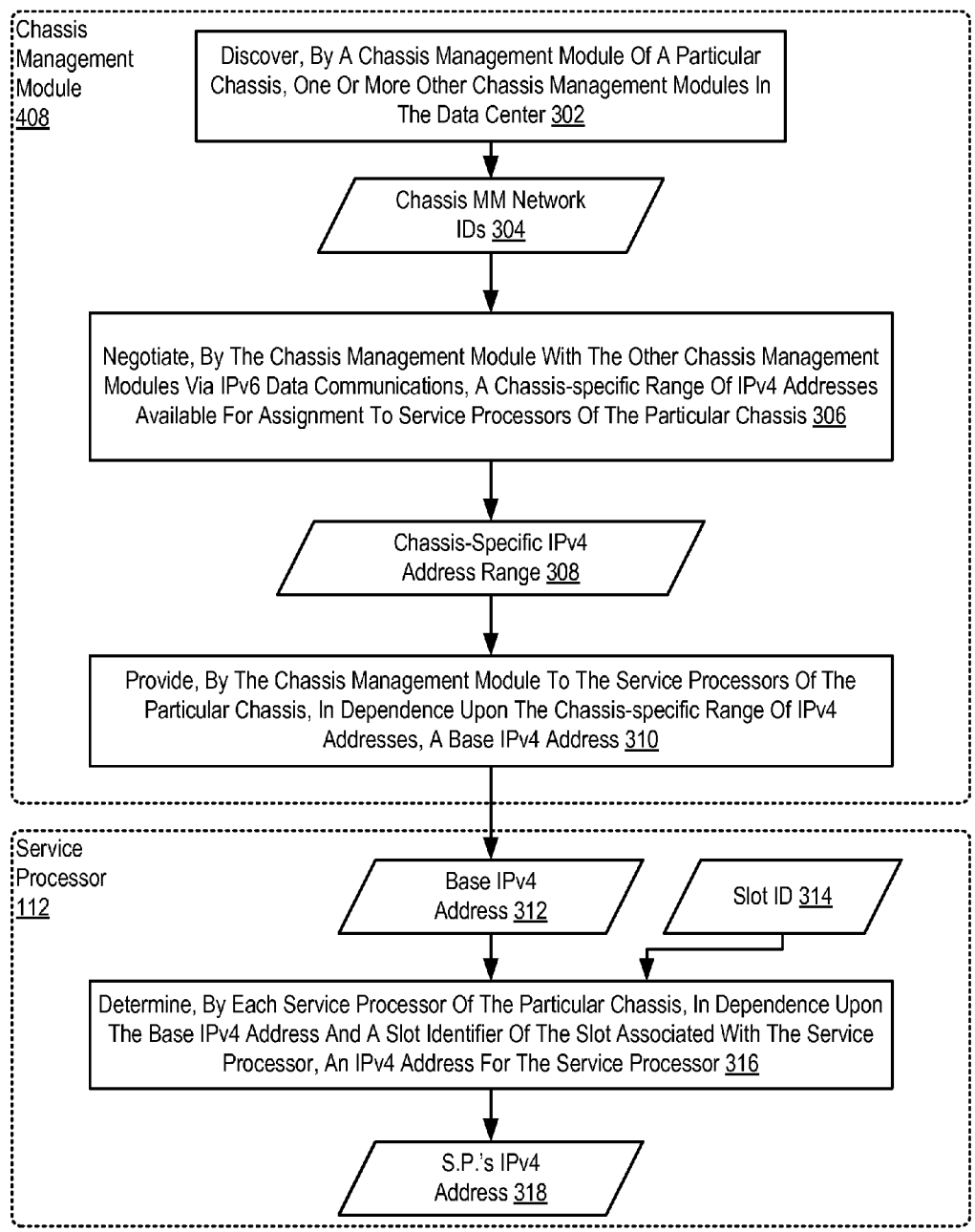
FIG. 3 sets forth a flow chart illustrating an exemplary method for network address assignment in a data center according to embodiments of the present invention.

For further explanation, FIG. 3 sets forth a flow chart illustrating an exemplary method for network address assignment in a data center according to embodiments of the present invention. The method of FIG. 3 is carried out in a data center similar to the data center (120) in the example of FIG. 1 that includes a number of chassis with each chassis including a chassis management module (408) and a number of slots, where each slot is associated with a service processor (112).

The method of FIG. 3 includes discovering (302), by a chassis management module (408) of a particular chassis, one or more other chassis management modules in the data center. Discovering (302) one or more other chassis management modules in the data center may be carried out by broadcasting an SLP discovery request message on a private management network and receiving in response to the SLP discovery request message, IPv6 network addresses (304) (or other network identifiers) of chassis management modules in the data center.

The method of FIG. 3 also includes negotiating (306), by the chassis management module (408) with the other chassis management modules via IPv6 data communications, a chassis-specific range (308) of IPv4 addresses available for assignment to service processors (112) of the particular chassis and providing (310), by the chassis management module (408) to the service processors (112) of the particular chassis, in dependence upon the chassis-specific range (308) of IPv4 addresses, a base IPv4 address (312). Providing (310) a base IPv4 address (312) to the service processors (112) of the particular chassis may be carried out by sending the base IPv4 address (312) to the service processors in a data communications message on an out-of-band network, storing the value of the base IPv4 address in a pre-designated memory location accessible by the service processor, implementing the base IPv4 address in a register of each service processor, and in other ways as will occur to readers of skill in the art.

The method of FIG. 3 continues by determining (316), by each service processor (112) of the particular chassis, in dependence upon the base IPv4 address (312) and a slot identifier (314) of the slot associated with the service processor (112), an IPv4 address (318) for the service processor (112). Determining (316) an IPv4 address (318) in dependence upon the base IPv4 address (312) and a slot identifier (314) may be carried out by summing the base IPv4 address (312) the slot identifier (314). Consider, for example, a base IPv4 address of 192.167.70.10 and a slot identifier associated with the service processor of 10. In such an example, the service processor associated with slot 10 may determine an IPv4 address for itself by summing 192.168.70.10 and 10 for a resulting IPv4 address of 192.168.70.20.

Figure 4:
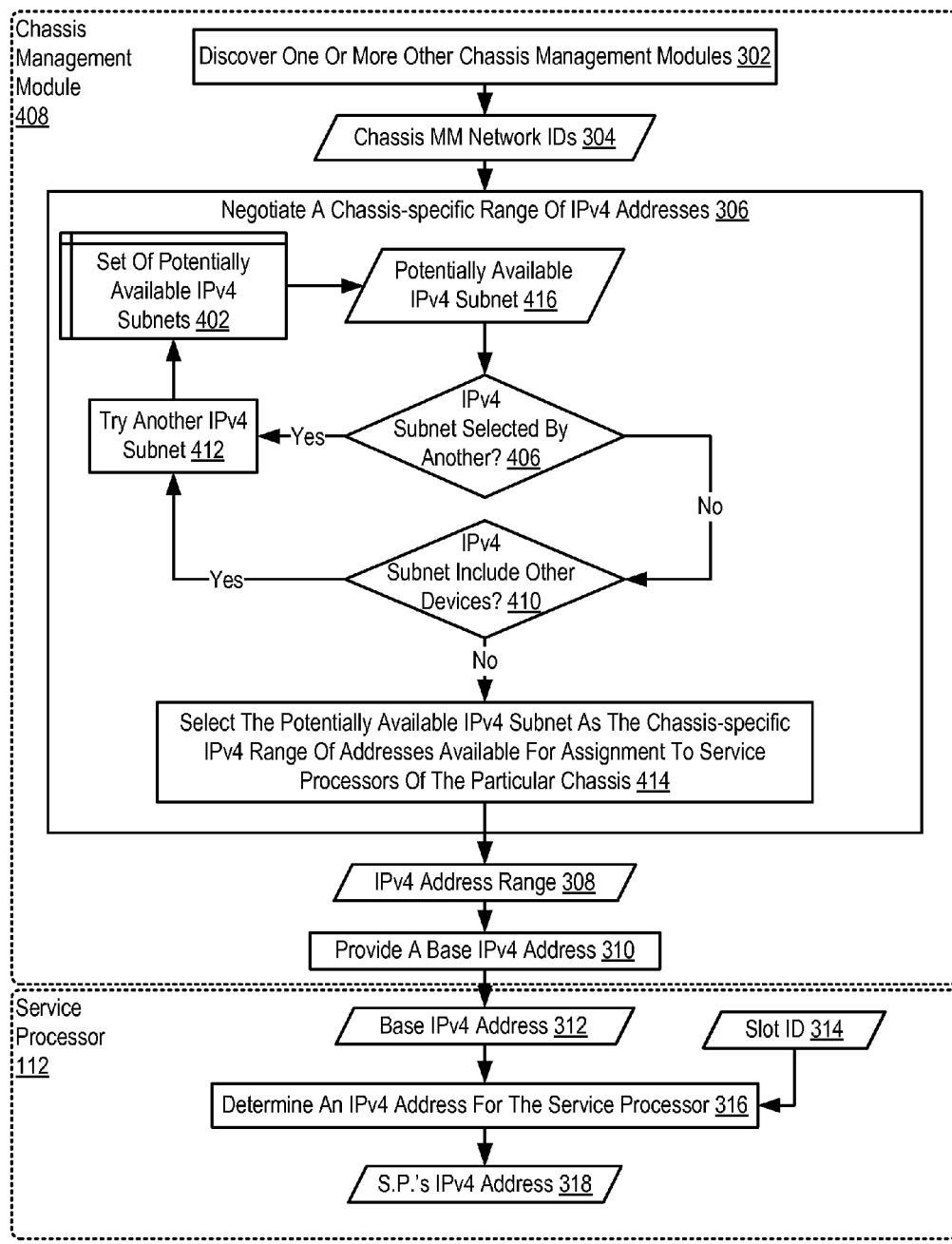
FIG. 4 sets forth a flow chart illustrating a further exemplary method for network address assignment in a data center according to embodiments of the present invention.

For further explanation, FIG. 4 sets forth a flow chart illustrating a further exemplary method for network address assignment in a data center according to embodiments of the present invention. The method of FIG. 4 is similar to the method of FIG. 3 in that the method of FIG. 4 is carried out in a data center that includes a number of chassis, each chassis including a chassis management module and a number of slots, and each slot associated with a service processor. The method of FIG. 4 is also similar to the method of FIG. 3 in that the method of FIG. 4 includes discovering (302) one or more other chassis management modules; negotiating (306) a chassis-specific range (308) of IPv4 addresses; providing (310) a base IPv4 address (312); and determining (316) an IPv4 address (318) for the service processor (112).

The method of FIG. 4 differs from the method of FIG. 3, however, in that in the method of FIG. 4, negotiating (306) a chassis-specific range (308) of IPv4 addresses includes by determining (406) whether a potentially available IPv4 subnet (416), from a set (402) of potentially available IPv4 subnets, is selected by another chassis management module. A subnet, or subnetwork, is a logically visible, distinctly addressed part of a single IP network. The process of subnetting is the division of a computer network into groups of computers that have a common, designated IP address routing prefix. Subnetting breaks a network into smaller realms that may use existing address space more efficiently, and, when physically separated, may prevent excessive rates of Ethernet packet collision in a larger network. Subnets may be arranged logically in a hierarchical architecture, partitioning an organization's network address space into a tree-like routing structure. Routers are used to interchange traffic between subnetworks and constitute logical or physical borders between the subnets. Routers manage traffic between subnets based on the high-order bit sequence (routing prefix) of the addresses.

A set (402) of potentially available IPv4 subnets is a specification of a number of subnets from which the chassis management module is to identify (negotiate) a chassis-specific address range. The set (402) may be include a list of subnets, may specify a starting subnet from which chassis management modules may iterate, or may specify a number of subnets in any other way as will occur to readers of skill in the art. Effectively, a set (402) of potentially available subnets, is a default starting point for chassis management modules.

Determining (406) whether a potentially available IPv4 subnet (416), from a set (402) of potentially available IPv4 subnets, is selected by another chassis management module may be carried out in various ways. Chassis management modules may be configured to maintain a data structure including selected subnets, broadcast selections of subnets to all other chassis management modules, and determine from their local copy of the maintained data structure included selected subnets, whether a particular subnet has already been selected. Another way in which a chassis management module may determining whether a potentially available IPv4 subnet is already selected is by broadcasting, in a selection request, the potentially available subnet to all other chassis management modules. In such an embodiment, chassis management modules may be configured to responds to a selection request affirming or denying selection of a potentially available subnet included in the selection request. These are but two ways among many in which chassis management modules may determine whether a potentially available subnet is actually available, that is, not currently selected by another chassis management module, and each such way is well within the scope of the present invention.

If the potentially available IPv4 subnet (416) is not selected by another chassis management module, negotiating (306) a chassis-specific range (308) of IPv4 addresses continues by trying (412) another IPv4 subnet (416) from the set (402) of potentially available IPv4 subnets. If, however, the potentially available IPv4 subnet (416) is not selected by another chassis management module, negotiating (306) a chassis-specific range (308) of IPv4 addresses continues by determining (410) whether the potentially available IPv4 subnet (416) includes other devices, including using an IPv4 address of the potentially available IPv4 subnet (416) to broadcast device discovery requests within the potentially available IPv4 subnet (416). Although the IPv4 subnet has not been selected by another chassis, the subnet itself may still be in use by other devices. To insure that address conflicts will not arise, the chassis management module (408) in the example of FIG. 4 determines whether the subnet—even when not selected by another chassis—is in use by other devices.

If the potentially available IPv4 subnet (416) does include another device, negotiating (306) a chassis-specific range (308) of IPv4 addresses continues by trying (412) another potentially available IPv4 subnet (416) from the set (402) of potentially available IPv4 subnets. If the potentially available IPv4 subnet (416) includes no other devices, negotiating (306) a chassis-specific range (308) of IPv4 addresses continues by selecting (414) the potentially available IPv4 subnet (416) as the chassis-specific IPv4 range (308) of addresses available for assignment to service processors of the particular chassis.

Figure 5:
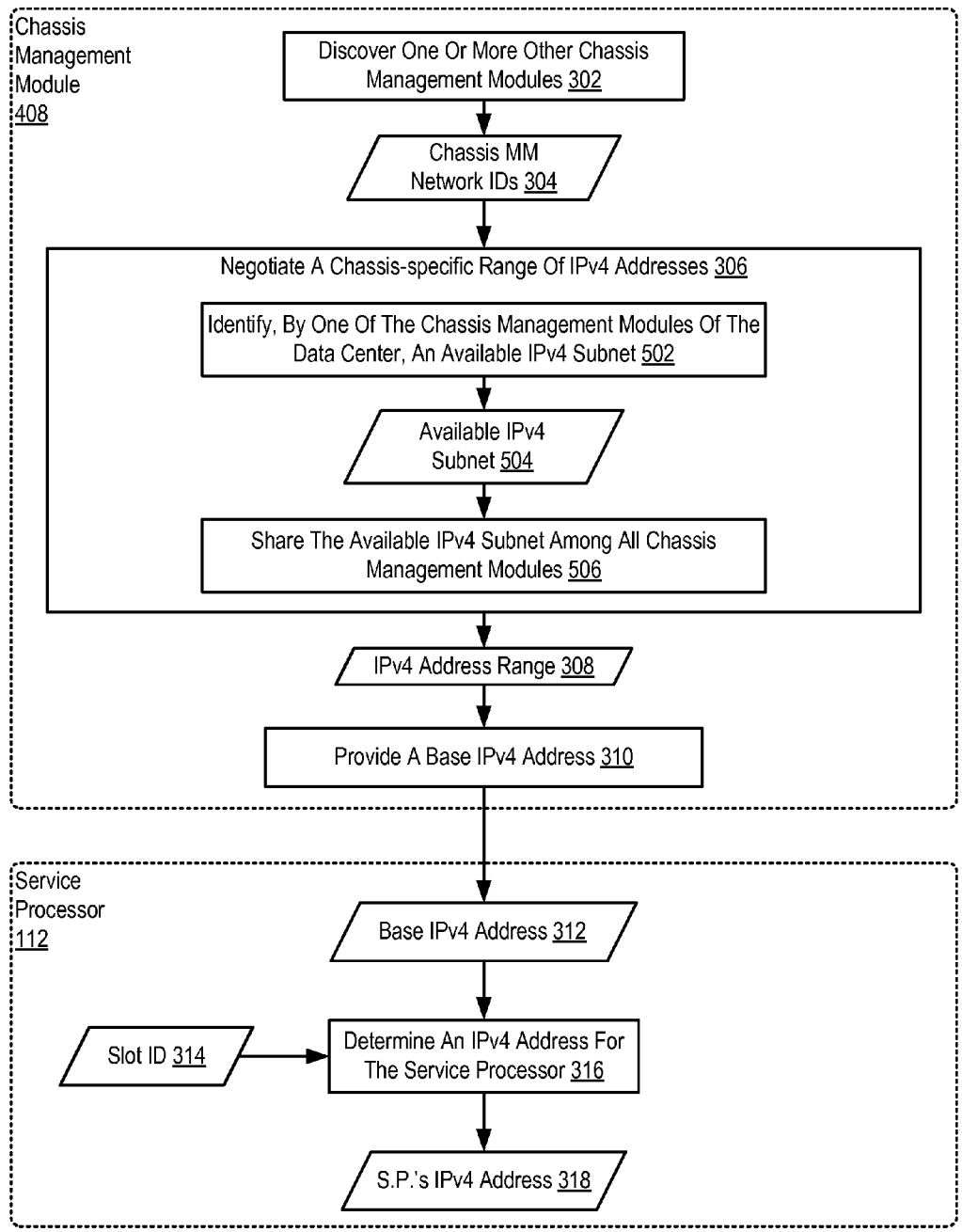
FIG. 5 sets forth a flow chart illustrating a further exemplary method for network address assignment in a data center according to embodiments of the present invention.

For further explanation, FIG. 5 sets forth a flow chart illustrating a further exemplary method for network address assignment in a data center according to embodiments of the present invention. The method of FIG. 5 is similar to the method of FIG. 3 in that the method of FIG. 5 is carried out in a data center that includes a number of chassis, each chassis including a chassis management module and a number of slots, and each slot associated with a service processor. The method of FIG. 5 is also similar to the method of FIG. 3 in that the method of FIG. 5 includes discovering (302) one or more other chassis management modules; negotiating (306) a chassis-specific range (308) of IPv4 addresses; providing (310) a base IPv4 address (312); and determining (316) an IPv4 address (318) for the service processor (112).

The method of FIG. 5 differs from the method of FIG. 3, however, in that in the method of FIG. 5, negotiating (306) a chassis-specific range (308) of IPv4 addresses is carried out by identifying (502), by one of the chassis management modules of the data center, an available IPv4 subnet (504); and sharing (506) the available IPv4 subnet (504) among all chassis management modules. A chassis management module (the chassis management module (408) in this example) may identify (502) an available IPv4 subnet (504) in manner similar to that described with regard to FIG. 4: by selecting a potentially available subnet from a predefined set of potentially available subnets and determining that no other device is already using the subnet. Once identified, the chassis management module that carried out the identification may then share (506) the available IPv4 subnet among other chassis management modules by providing to each of the other management modules, a chassis-specific range of IPv4 addresses selected from the IPv4 subnet. Consider, for example, a set of three chassis, each including ten slots. In such an example, each chassis management module need only ten IPv4 address to assign to the service processors. The chassis management module identifying the available subnet (504) may provide, to each of the other two chassis management modules, ten IPv4 addresses within the subnet. In this way, only one available subnet need be identified to provide IPv4 addresses to all service processors in the data center.

Figure 6:
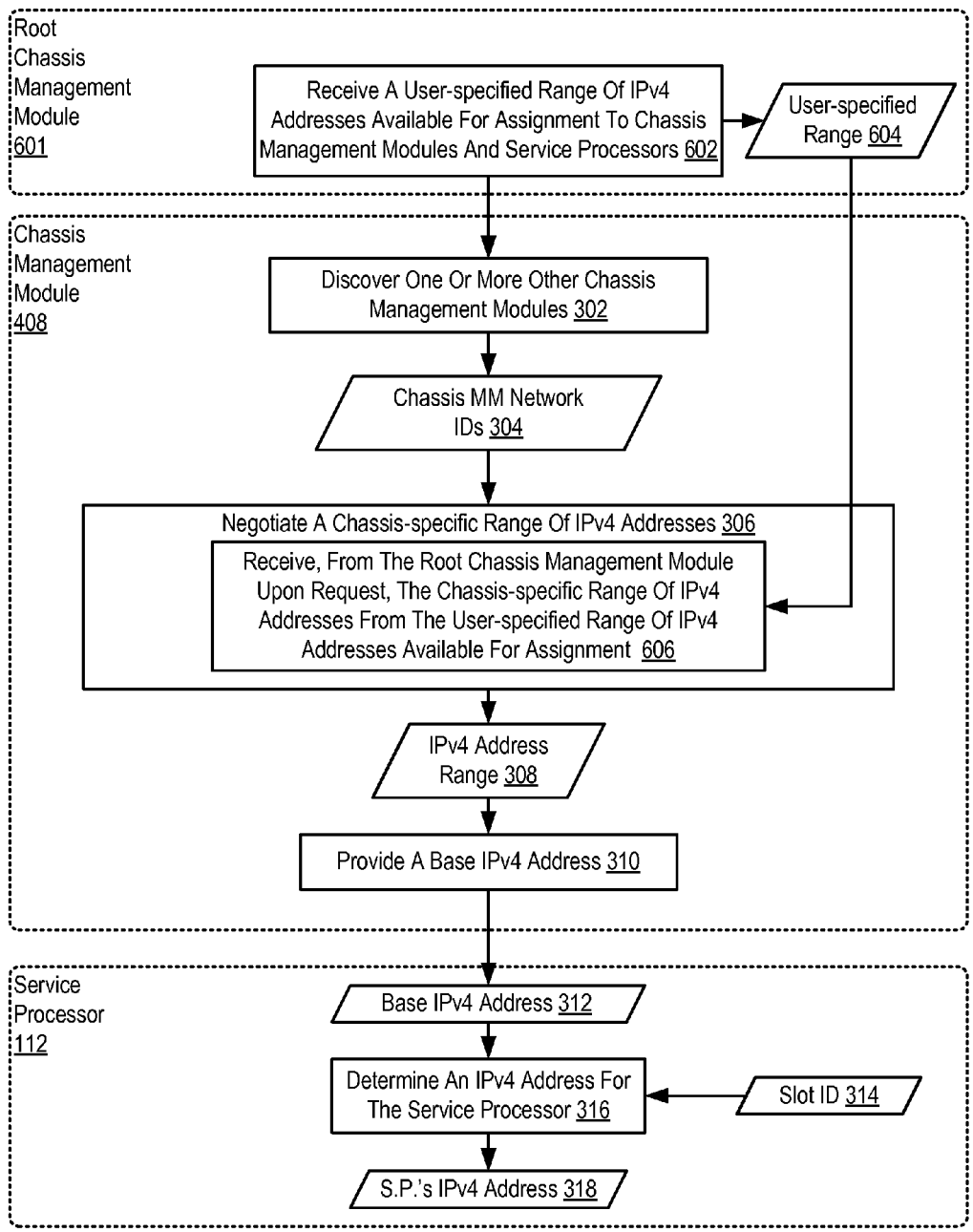
FIG. 6 sets forth a flow chart illustrating a further exemplary method for network address assignment in a data center according to embodiments of the present invention.

For further explanation, FIG. 6 sets forth a flow chart illustrating a further exemplary method for network address assignment in a data center according to embodiments of the present invention. The method of FIG. 6 is similar to the method of FIG. 3 in that the method of FIG. 6 is carried out in a data center that includes a number of chassis, each chassis including a chassis management module and a number of slots, and each slot associated with a service processor. The method of FIG. 6 is also similar to the method of FIG. 3 in that the method of FIG. 6 includes discovering (302) one or more other chassis management modules; negotiating (306) a chassis-specific range (308) of IPv4 addresses; providing (310) a base IPv4 address (312); and determining (316) an IPv4 address (318) for the service processor (112).

The method of FIG. 6 differs from the method of FIG. 3, however, in that the method of FIG. 6 includes, receiving (602), by a root chassis management module (601), a user-specified range (604) of IPv4 addresses available for assignment to chassis management modules and service processors. A root chassis management module (601) is a chassis management module configured to operate as a primary module in negotiating chassis-specific ranges of IPv4 addresses. That is, other chassis management modules request IPv4 addresses from the root chassis management module. A user-specified range (604) of IPv4 addresses available for assignment to chassis management modules and service processors may be implemented as a data structure specifying a set of IPv4 addresses. A system administrator or other user may provide the user-specified range of IPv4 address to a chassis management module (601).

In the example of FIG. 6, negotiating (306) a chassis-specific range (308) of IPv4 addresses is carried out by receiving (606), from the root chassis management module (601), upon request by the chassis management module of the particular chassis, the chassis-specific range of IPv4 addresses (308) from the user-specified range (604) of IPv4 addresses available for assignment. That is, a chassis management module (408) may request from a root chassis management module (601) a chassis-specific range of IPv4 addresses, and the root chassis management module (601) may respond to the request with a set of addresses derived from the user-specified range of IPv4 addresses. In some embodiments, a chassis management module (408) may also include a number of slots in the chassis management module's chassis to enable the root chassis management module to know the number of addresses to provide to the requesting chassis management module.

Figure 7:
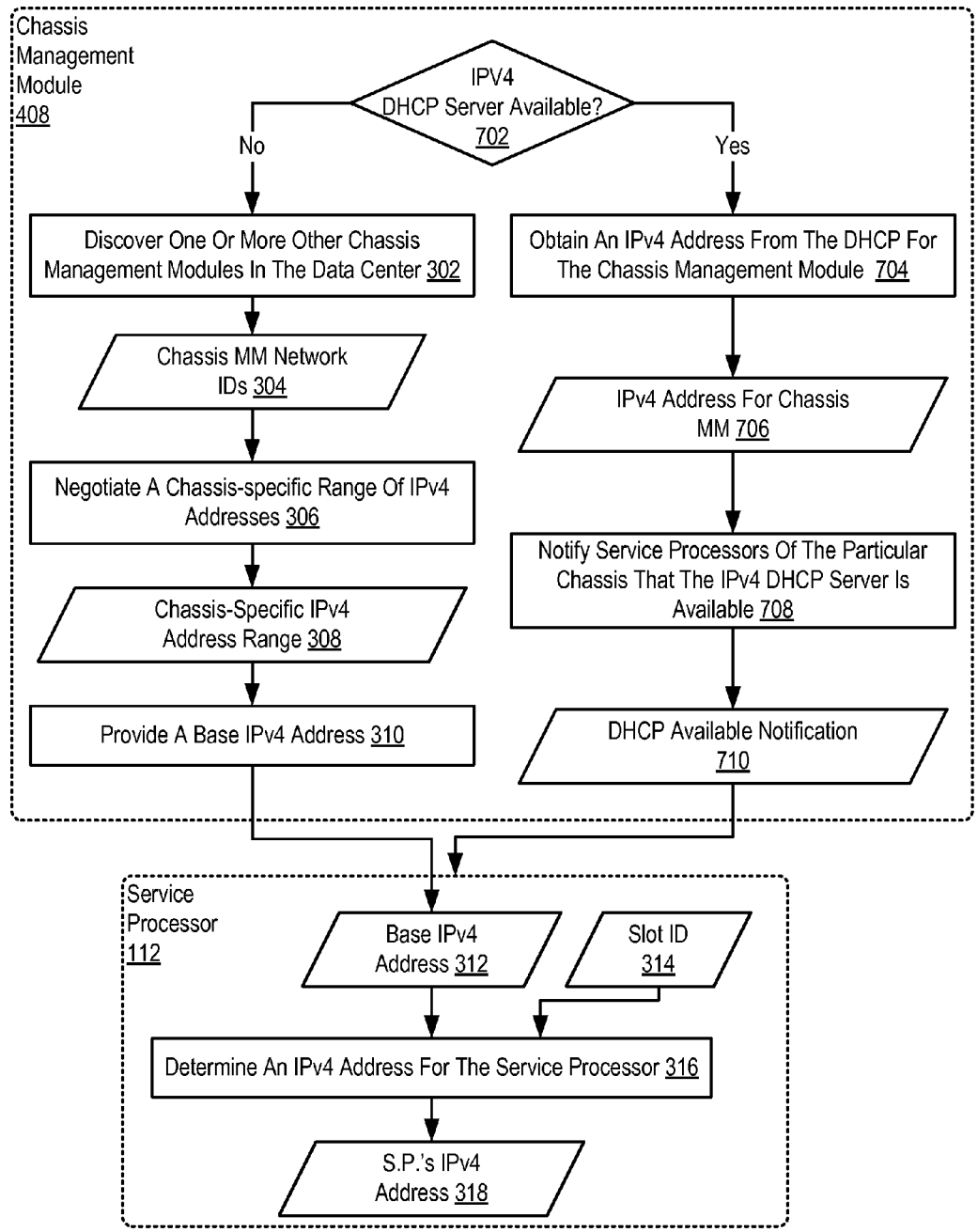
FIG. 7 sets forth a flow chart illustrating a further exemplary method for network address assignment in a data center according to embodiments of the present invention.

For further explanation, FIG. 7 sets forth a flow chart illustrating a further exemplary method for network address assignment in a data center according to embodiments of the present invention. The method of FIG. 7 is similar to the method of FIG. 3 in that the method of FIG. 7 is carried out in a data center that includes a number of chassis, each chassis including a chassis management module and a number of slots, and each slot associated with a service processor. The method of FIG. 7 is also similar to the method of FIG. 3 in that the method of FIG. 7 includes discovering (302) one or more other chassis management modules; negotiating (306) a chassis-specific range (308) of IPv4 addresses; providing (310) a base IPv4 address (312); and determining (316) an IPv4 address (318) for the service processor (112).

The method of FIG. 7 differs from the method of FIG. 3, however, in that the method of FIG. 7 includes determining (702), by the chassis management module, whether a IPv4 DHCP server is available. If an IPv4 DHCP server is available, the method of FIG. 7 continues by obtaining (704), by the chassis management module, an IPv4 address (706) from the DHCP for the chassis management module and notifying (708), by the chassis management module, service processors (112) of the particular chassis that the IPv4 DHCP server is available. If, however, an IPv4 DHCP server is not available, the method of FIG. 7 continues by discovering (302) one or more other chassis management modules; negotiating (306) a chassis-specific range (308) of IPv4 addresses; providing (310) a base IPv4 address (312); and determining (316) an IPv4 address (318) for the service processor (112).

Figure 8:
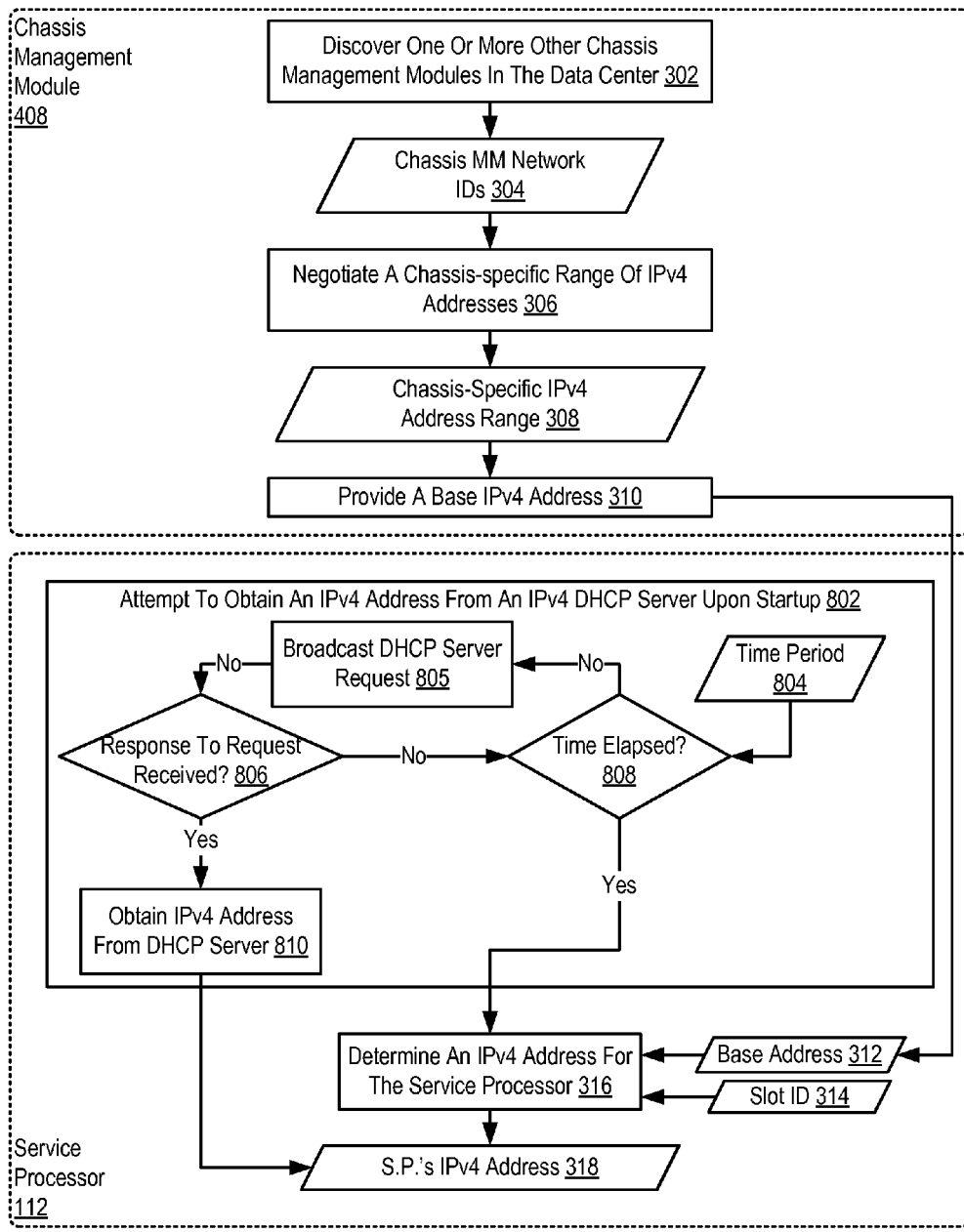
FIG. 8 sets forth a flow chart illustrating a further exemplary method for network address assignment in a data center according to embodiments of the present invention.

For further explanation, FIG. 8 sets forth a flow chart illustrating a further exemplary method for network address assignment in a data center according to embodiments of the present invention. The method of FIG. 8 is similar to the method of FIG. 3 in that the method of FIG. 8 is carried out in a data center that includes a number of chassis, each chassis including a chassis management module and a number of slots, and each slot associated with a service processor. The method of FIG. 8 is also similar to the method of FIG. 3 in that the method of FIG. 8 includes discovering (302) one or more other chassis management modules; negotiating (306) a chassis-specific range (308) of IPv4 addresses; providing (310) a base IPv4 address (312); and determining (316) an IPv4 address (318) for the service processor (112).

The method of FIG. 8 differs from the method of FIG. 3 in that the method of FIG. 8 includes attempting (802), for a predefined period of time (804), to obtain an IPv4 address from an IPv4 DHCP server by one or more of the service processors of the particular chassis upon startup of the service processors. Attempting (802) to obtain an IPv4 address from an IPv4 DHCP server in the method of FIG. 8 is carried out by: broadcasting (805) a DHCP server request, determining (806) whether a response to the request is received, and if no response is received, determining (808) if the predefined period of time (804) has elapsed. If the predefined period of time (804) has not elapsed, the method continues by broadcasting (805) another DHCP server request. This process may continue until either the predefined period of time is elapsed or a response to a DHCP server request is received. If a response to DHCP server request is received, the method continues by obtaining (810) an IPv4 address from the DHCP server. In the method of FIG. 8, the service processor determines (316) an IPv4 address (318) only if the predefined period of time (804) elapses prior to obtaining an IPv4 address from an IPv4 DHCP server upon startup.

Figure 9:
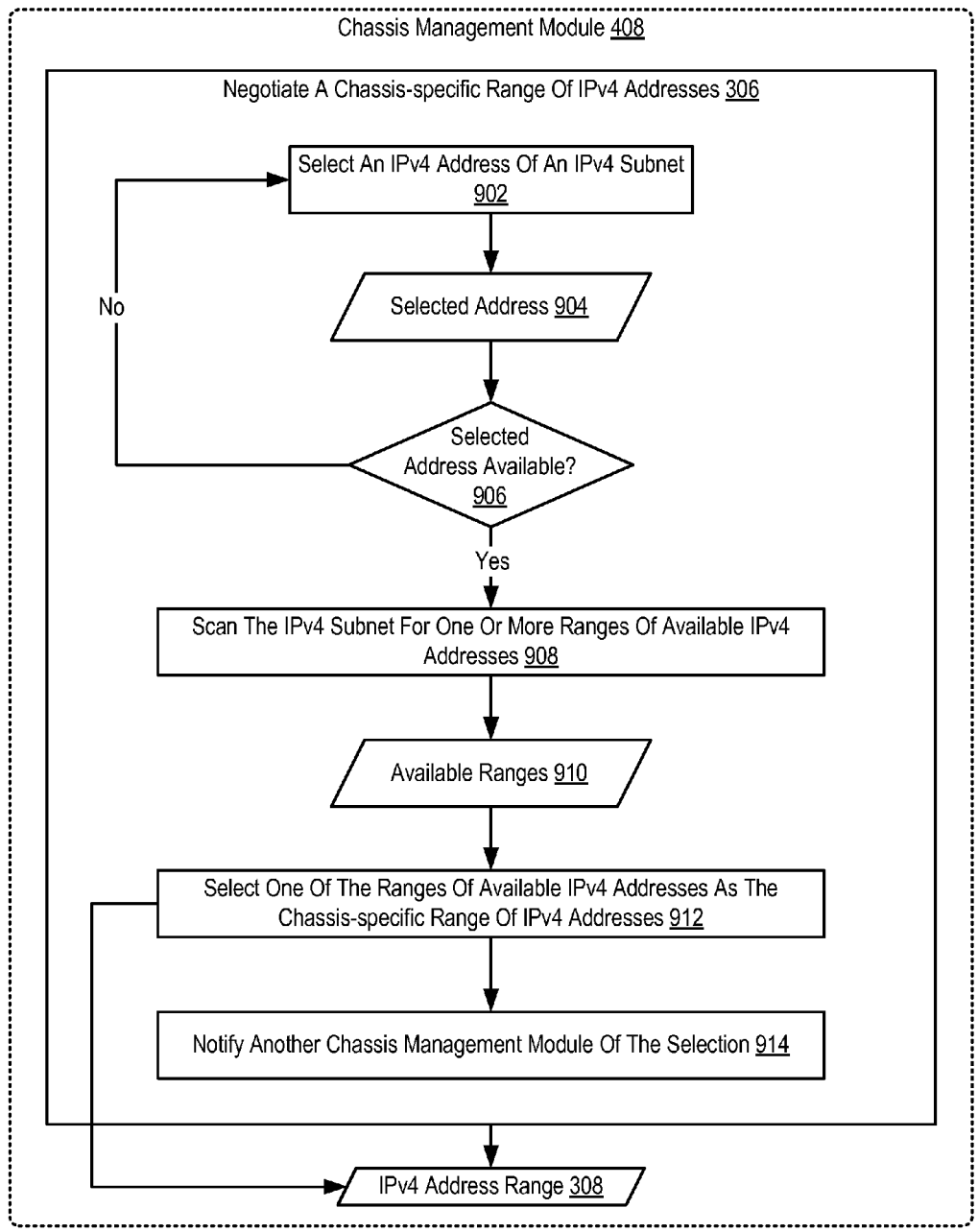
FIG. 9 sets forth a flow chart illustrating an exemplary method for negotiating a chassis-specific range of IPv4 addresses in accordance with embodiments of the present invention.

For further explanation, FIG. 9 sets forth a flow chart illustrating an exemplary method for negotiating (306) a chassis-specific range (308) of IPv4 addresses in accordance with embodiments of the present invention. Either in discovering (302 on FIG. 3) other chassis management modules or as part of negotiating (306) a chassis-specific range of IPv4 addresses, a chassis management module (408) may request from other chassis management modules and provide to other chassis management modules, information describing the number of IPv4 addresses needed by the chassis management module to assign to the service processors of the chassis management module's chassis. In some embodiments, separate chassis may have any number of service processors and each chassis may have a different number of service processors. To negotiate a chassis-specific range of IP addresses, while insuring that other chassis management modules will be able to obtain the needed number of IP addresses, the chassis management modules obtain information describing other chassis management module's IP address needs. This information may be used more specifically in optimizing the scanning (908) IPv4 subnets for ranges of available IPv4 addresses, selecting (912) ranges of available IPv4 addresses, and notifying (914) other chassis management modules as described below in detail with regard to FIG. 10.

The method of FIG. 9 includes selecting (902), by the chassis management module of the particular chassis, an IPv4 address of an IPv4 subnet for itself. Selecting an IPv4 address may be carried out in various ways, including, for example, by selecting an IPv4 default address preconfigured by a system administrator. The method of FIG. 9 also includes determining (906) if the selected IPv4 address (904) is available. Determining whether the selected IPv4 address is available may be carried out in various ways including pinging the address for a response for example.

If the selected IPv4 address (904) is available, the method of FIG. 9 continues by scanning (908) the IPv4 subnet for one or more ranges (910) of available IPv4 addresses. The term 'available' as used here to describe an IPv4 address range means that no other device has been previously assigned an address in that range. The management module (408) may scan the IPv4 in several ways including for example, by a brute-force iterative process of pinging subsequent IPv4 address, by one or more SLP discovery requests, or in various other ways as will occur to readers of skill in the art.

The method of FIG. 9 also includes selecting (912) one of the ranges of available IPv4 addresses as the chassis-specific range of IPv4 addresses available for assignment to service processors of the particular chassis and notifying (914) another chassis management module of the selection. Notifying (914) another chassis management module may be carried out in various ways. In some embodiments for example, the chassis management module (408) may notify other management modules that a selection has been made, without providing the selected address range. In other embodiments, the chassis management module (408) may notify other management modules that a selection has been made and provide the selected address range. In yet other embodiments, discussed in detail with respect to FIG. 10 below, a chassis management module, in notifying other chassis management modules, may also provide a chassis-specific range of addresses to the other management modules. That is, a chassis management module may effectively assign ranges of address, identified as available addresses, to various management modules.

Figure 10:
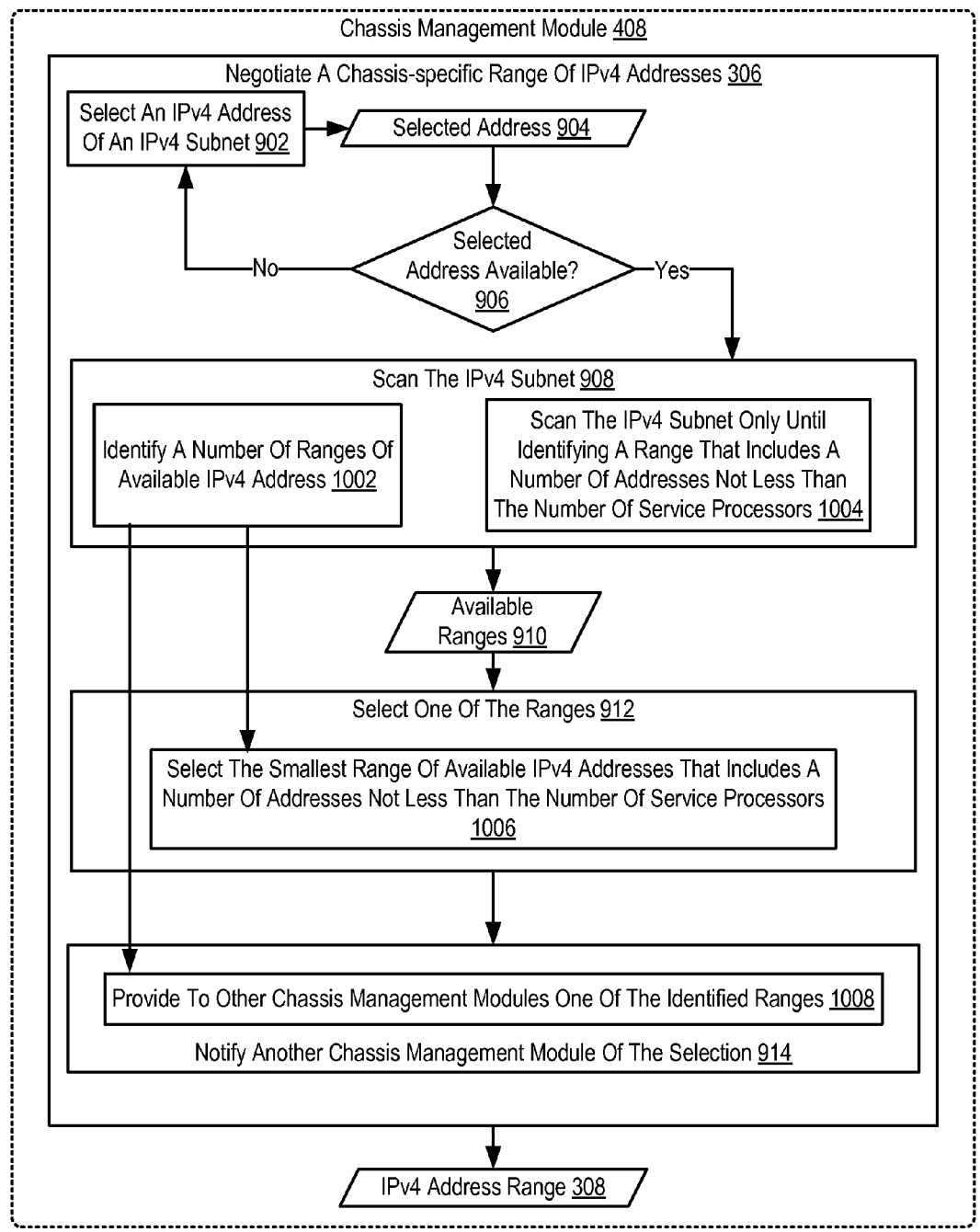
FIG. 10 sets forth a flow chart illustrating a further exemplary method for negotiating a chassis-specific range of IPv4 addresses in accordance with embodiments of the present invention.

For further explanation, FIG. 10 sets forth a flow chart illustrating a further exemplary method for negotiating (306) a chassis-specific range (308) of IPv4 addresses in accordance with embodiments of the present invention. The method of FIG. 10 is similar to the method of FIG. 9 in that the method of FIG. 10 includes selecting (902) an IPv4 address of an IPv4 subnet; determining (906) if the selected IPv4 address (904) is available; if the selected IPv4 address (904) is available, scanning (908) the IPv4 subnet for one or more ranges (910) of available IPv4 addresses; selecting (912) one of the ranges; and notifying (914) another chassis management module of the selection.

The method of FIG. 10, however, sets forth several methods of optimized negotiation (306) of chassis-specific ranges of IPv4 addresses among chassis management modules. In one optimized method of negotiation (306) presented in the method of FIG. 10, scanning (908) the IPv4 subnet for one or more ranges of available IPv4 addresses is carried out by identifying (1002) a plurality of ranges of available IPv4 address and selecting (912) one of the ranges is carried out by selecting (1006), from the plurality of ranges, the smallest range of available IPv4 addresses that includes a number of addresses not less than the number of service processors in the particular chassis. In this optimized method of negotiation, the chassis management module identifies several ranges of available addresses—or 'holes' in a subnet—and selects the smallest hole that is largest enough to include all the service processors in the chassis management module's chassis.

In another optimized method of negotiation (306) presented in the method of FIG. 10, scanning (908) the IPv4 subnet for one or more ranges of available IPv4 addresses is carried out by scanning (1004) the IPv4 subnet only until identifying a range of available IPv4 address that includes a number of addresses not less than the number of service processors in the particular chassis. That is, the chassis management module (408) in the example of FIG. 1 will scan until identifying a hole large enough to include all the service processors in the chassis management module's chassis then stop scanning. This may be carried out more quickly than the previous optimization, but also may be a bit more wasteful of available IP addresses, effectively reserving for a particular chassis far more addresses then absolutely necessary. Consider, for example, that the chassis includes ten service processors and the first address range identified having a number of addresses greater than ten actually includes 100 addresses. In this example, the chassis management module stops scanning and selects the 100 address range for itself, without regard to the needs of other chassis management modules.

In another optimized method of negotiation (306) presented in the method of FIG. 10, scanning (908) the IPv4 subnet for one or more ranges of available IPv4 addresses is carried out by identifying (1002) a plurality of ranges of available IPv4 address and notifying (914) another chassis management module of the selection is carried out by providing (1008) to one or more of the other chassis management modules, as a chassis-specific range of IPv4 addresses, one of the identified plurality of ranges of available IPv4 addresses. In this optimization, one chassis management module, acting as a primary or root management module, identifies several ranges and, based on information describing IPv4 address needs of other chassis management modules obtained during discovery of the chassis management modules or earlier in negotiating the IPv4 address ranges, assigns identifies holes to the other chassis, management modules. In this way, IP address ranges are tailored to the particular IP address needs of chassis management modules in a non-wasteful manner. In some implementations of this optimization, the chassis management module—based on the information describing IPv4 address needs of other chassis management modules, may also be configured to stop scanning (1004) when enough holes (address ranges) for all chassis management modules have been identified. That is, once the chassis management module has identified a range of IP addresses for each chassis management module, the chassis management module (408) need not continue to scan for other ranges.

Although three optimized methods of negotiating (306) chassis-specific range of IPv4 addresses are described here with respect of FIG. 10, readers of skill in the art will recognize that many various optimization techniques may employed to carry out such negotiation. Each such technique is well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of network address assignment in a data center, the data center comprising a plurality of chassis, each chassis comprising a chassis management module and a number of server slots, each server slot associated with a service processor, the method comprising:
   discovering, by a chassis management module of a particular chassis, one or more other chassis management modules in the data center;
   negotiating, by the chassis management module with the other chassis management modules via IPv6 data communications and without a Dynamic Host Configuration Protocol ('DHCP') server, a chassis-specific range of IPv4 addresses available for assignment to service processors of the particular chassis;
   providing, by the chassis management module to the service processors of the particular chassis, in dependence upon the chassis-specific range of IPv4 addresses, a base IPv4 address; and
   determining, by each service processor of the particular chassis, in dependence upon the base IPv4 address and a slot identifier of the server slot associated with the service processor, an IPv4 address for the service processor.

2. The method of claim 1 wherein negotiating a chassis-specific range of IPv4 addresses available for assignment to service processors of the particular chassis, further comprises:
   determining whether a potentially available IPv4 subnet, from a set of potentially available IPv4 subnets, is selected by another chassis management module;
   if the potentially available IPv4 subnet is not selected by another chassis management module, determining whether the potentially available IPv4 subnet includes other devices, including using an IPv4 address of the potentially available IPv4 subnet to broadcast device discovery requests within the potentially available IPv4 subnet; and
   if the potentially available IPv4 subnet includes no other devices, selecting the potentially available IPv4 subnet as the chassis-specific IPv4 range of addresses available for assignment to service processors of the particular chassis.

3. The method of claim 1 wherein negotiating a chassis-specific range of IPv4 addresses available for assignment to service processors of the particular chassis, further comprises:
   identifying, by one of the chassis management modules of the data center, an available IPv4 subnet; and
   sharing the available IPv4 subnet among all chassis management modules.

4. The method of claim 1 further comprising:
   receiving, by a root chassis management module, a user-specified range of IPv4 addresses available for assignment to chassis management modules and service processors,
   wherein negotiating a chassis-specific range of IPv4 addresses available for assignment to service processors of the particular chassis further comprises receiving, from the root chassis management module, upon request by the chassis management module of the particular chassis, the chassis-specific range of IPv4 addresses from the user-specified range of IPv4 addresses available for assignment.

5. The method of claim 1 further comprising:
   determining, by the chassis management module, whether a IPv4 DHCP server is available;
   if an IPv4 DHCP server is available: obtaining, by the chassis management module, an IPv4 address from the DHCP for the chassis management module and notifying, by the chassis management module, service processors of the particular chassis that the IPv4 DHCP server is available; and
   negotiating a chassis-specific IPv4 subnet for IPv4 communications among service processors of the particular chassis only if an IPv4 DHCP server is not available.

6. The method of claim 1 further comprising:
   attempting, for a predefined period of time, to obtain an IPv4 address from an IPv4 DHCP server by one or more of the service processors of the particular chassis upon startup of the service processors,
   wherein determining, by each service processor of the particular chassis, in dependence upon the base IPv4 address and a slot identifier of the server slot associated with the service processor, an IPv4 address for the service processor further comprises determining the IPv4 address for the service processor after the predefined period of time has lapsed without obtaining an IPv4 address from an IPv4 DHCP server.

7. The method of claim 1 wherein negotiating a chassis-specific range of IPv4 addresses available for assignment to service processors of the particular chassis further comprises:
   selecting, by the chassis management module of the particular chassis, an IPv4 address of an IPv4 subnet;
   determining whether the selected IPv4 address is available;
   if the selected IPv4 address is available, scanning the IPv4 subnet for one or more ranges of available IPv4 addresses;
   selecting one of the ranges of available IPv4 addresses as the chassis-specific range of IPv4 addresses available for assignment to service processors of the particular chassis; and
   notifying another chassis management module of the selection.

8. The method of claim 7, wherein:
   scanning the IPv4 subnet for one or more ranges of available IPv4 addresses further comprises identifying a plurality of ranges of available IPv4 address; and
   selecting one of the ranges of available IPv4 addresses as the chassis-specific range of IPv4 addresses available for assignment to service processors of the particular chassis further comprises selecting, from the plurality of ranges, the smallest range of available IPv4 addresses that includes a number of addresses not less than the number of service processors in the particular chassis.

9. The method of claim 7, wherein:
   scanning the IPv4 subnet for one or more ranges of available IPv4 addresses further comprises scanning the IPv4 subnet only until identifying a range of available IPv4 address that includes a number of addresses not less than the number of service processors in the particular chassis.

10. The method of claim 7, wherein:
    scanning the IPv4 subnet for one or more ranges of available IPv4 addresses further comprises identifying a plurality of ranges of available IPv4 addresses; and
    notifying another chassis management module of the selection further comprises providing to one or more of the other chassis management modules, as a chassis-specific range of IPv4 addresses, one of the identified plurality of ranges of available IPv4 addresses.

11. An apparatus for network address assignment in a data center, the data center comprising a plurality of chassis, each chassis comprising a chassis management module and a number of server slots, each server slot associated with a service processor, the apparatus comprising a computer processor, a computer memory operatively coupled to the computer processor, the computer memory having disposed within it computer program instructions that, when executed by the computer processor, perform the steps of:

discovering, by a chassis management module of a particular chassis, one or more other chassis management modules in the data center;

negotiating, by the chassis management module with the other chassis management modules via IPv6 data communications and without a Dynamic Host Configuration Protocol ('DHCP') server, a chassis-specific range of IPv4 addresses available for assignment to service processors of the particular chassis;

providing, by the chassis management module to the service processors of the particular chassis, in dependence upon the chassis-specific range of IPv4 addresses, a base IPv4 address; and determining, by each service processor of the particular chassis, in dependence upon the base IPv4 address and a slot identifier of the server slot associated with the service processor, an IPv4 address for the service processor.

12. The apparatus of claim 11 wherein negotiating a chassis-specific range of IPv4 addresses available for assignment to service processors of the particular chassis, further comprises:

determining whether a potentially available IPv4 subnet, from a set of potentially available IPv4 subnets, is selected by another chassis management module;

if the potentially available IPv4 subnet is not selected by another chassis management module, determining whether the potentially available IPv4 subnet includes other devices, including using an IPv4 address of the potentially available IPv4 subnet to broadcast device discovery requests within the potentially available IPv4 subnet; and if the potentially available IPv4 subnet includes no other devices, selecting the potentially available IPv4 subnet as the chassis-specific IPv4 range of addresses available for assignment to service processors of the particular chassis.

13. The apparatus of claim 11 wherein negotiating a chassis-specific range of IPv4 addresses available for assignment to service processors of the particular chassis, further comprises:

identifying, by one of the chassis management modules of the data center, an available IPv4 subnet; and sharing the available IPv4 subnet among all chassis management modules.

14. The apparatus of claim 11 further comprising computer program instructions that, when executed by the computer processor, perform the steps of:

receiving, by a root chassis management module, a user-specified range of IPv4 addresses available for assignment to chassis management modules and service processors, wherein negotiating a chassis-specific range of IPv4 addresses available for assignment to service processors of the particular chassis further comprises receiving, from the root chassis management module, upon request by the chassis management module of the particular chassis, the chassis-specific range of IPv4 addresses from the user-specified range of IPv4 addresses available for assignment.

15. The apparatus of claim 11 further comprising computer program instructions that, when executed by the computer processor, perform the steps of:

determining, by the chassis management module, whether a IPv4 DHCP server is available;

if an IPv4 DHCP server is available: obtaining, by the chassis management module, an IPv4 address from the DHCP for the chassis management module and notifying, by the chassis management module, service processors of the particular chassis that the IPv4 DHCP server is available; and negotiating a chassis-specific IPv4 subnet for IPv4 communications among service processors of the particular chassis only if an IPv4 DHCP server is not available.

16. The apparatus of claim 11 further comprising computer program instructions that, when executed by the computer processor, perform the steps of:

attempting, for a predefined period of time, to obtain an IPv4 address from an IPv4 DHCP server by one or more of the service processors of the particular chassis upon startup of the service processors, wherein determining, by each service processor of the particular chassis, in dependence upon the base IPv4 address and a slot identifier of the server slot associated with the service processor, an IPv4 address for the service processor further comprises determining the IPv4 address for the service processor after the predefined period of time has lapsed without obtaining an IPv4 address from an IPv4 DHCP server.

17. A computer program product for network address assignment in a data center, the data center comprising a plurality of chassis, each chassis comprising a chassis management module and a number of server slots, each server slot associated with a service processor, the computer program product disposed upon a computer readable medium, where the computer readable medium is not a signal, the computer program product comprising computer program instructions that, when executed, cause a computer to carry out the steps of:

discovering, by a chassis management module of a particular chassis, one or more other chassis management modules in the data center;

negotiating, by the chassis management module with the other chassis management modules via IPv6 data communications and without a Dynamic Host Configuration Protocol ('DHCP') server, a chassis-specific range of IPv4 addresses available for assignment to service processors of the particular chassis;

providing, by the chassis management module to the service processors of the particular chassis, in dependence upon the chassis-specific range of IPv4 addresses, a base IPv4 address; and determining, by each service processor of the particular chassis, in dependence upon the base IPv4 address and a slot identifier of the server slot associated with the service processor, an IPv4 address for the service processor.

18. The computer program product of claim 17 wherein negotiating a chassis-specific range of IPv4 addresses available for assignment to service processors of the particular chassis, further comprises:

determining whether a potentially available IPv4 subnet, from a set of potentially available IPv4 subnets, is selected by another chassis management module;

if the potentially available IPv4 subnet is not selected by another chassis management module, determining whether the potentially available IPv4 subnet includes other devices, including using an IPv4 address of the potentially available IPv4 subnet to broadcast device discovery requests within the potentially available IPv4 subnet; and if the potentially available IPv4 subnet includes no other devices, selecting the potentially available IPv4 subnet as the chassis-specific IPv4 range of addresses available for assignment to service processors of the particular chassis.

19. The computer program product of claim 17 wherein negotiating a chassis-specific range of IPv4 addresses available for assignment to service processors of the particular chassis, further comprises:

identifying, by one of the chassis management modules of the data center, an available IPv4 subnet; and sharing the available IPv4 subnet among all chassis management modules.

20. The computer program product of claim 17 further comprising computer program instructions that, when executed, cause a computer to carry out the steps of:

receiving, by a root chassis management module, a user-specified range of IPv4 addresses available for assignment to chassis management modules and service processors, wherein negotiating a chassis-specific range of IPv4 addresses available for assignment to service processors of the particular chassis further comprises receiving, from the root chassis management module, upon request by the chassis management module of the particular chassis, the chassis-specific range of IPv4 addresses from the user-specified range of IPv4 addresses available for assignment.

21. The computer program product of claim 17 further comprising computer program instructions that when executed, cause a computer to carry out the steps of:

determining, by the chassis management module, whether a IPv4 DHCP server is available;

if an IPv4 DHCP server is available: obtaining, by the chassis management module, an IPv4 address from the DHCP for the chassis management module and notifying, by the chassis management module, service processors of the particular chassis that the IPv4 DHCP server is available; and negotiating a chassis-specific IPv4 subnet for IPv4 communications among service processors of the particular chassis only if an IPv4 DHCP server is not available.

22. The computer program product of claim 17 further comprising computer program instructions that, when executed, cause a computer to carry out the steps of:

attempting, for a predefined period of time, to obtain an IPv4 address from an IPv4 DHCP server by one or more of the service processors of the particular chassis upon startup of the service processors, wherein determining, by each service processor of the particular chassis, in dependence upon the base IPv4 address and a slot identifier of the server slot associated with the service processor, an IPv4 address for the service processor further comprises determining the IPv4 address for the service processor after the predefined period of time has lapsed without obtaining an IPv4 address from an IPv4 DHCP server.

* * * * *